(12) United States Patent
Sokol et al.

(10) Patent No.: US 7,044,761 B2
(45) Date of Patent: May 16, 2006

(54) TRANSPARENT INSULATING ENCLOSURE

(75) Inventors: Robert L. Sokol, Orland Park, IL (US); Robert W. Kossak, Lemont, IL (US); Larry S. Mohr, Peotone, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/819,840

(22) Filed: Apr. 7, 2004

(65) Prior Publication Data

US 2004/0219820 A1 Nov. 4, 2004

Related U.S. Application Data

(60) Provisional application No. 60/461,907, filed on Apr. 10, 2003.

(51) Int. Cl.
*H01R 13/15* (2006.01)

(52) U.S. Cl. ............... 439/263; 439/369; 174/138 F
(58) Field of Classification Search ............... 439/263, 439/352, 369; 174/138 F, 92
See application file for complete search history.

(56) References Cited

U.S. PATENT DOCUMENTS

| | | | |
|---|---|---|---|
| 2,894,056 A | 7/1959 | Bogese | |
| 3,183,302 A | 5/1965 | Wochner et al. | 174/138 F |
| 3,223,776 A | 12/1965 | Piasecki | 174/138 F |
| 3,278,674 A | 10/1966 | Matthysse et al. | 174/138 |
| 3,484,541 A | 12/1969 | Campbell | 174/138 |
| 3,560,632 A | 2/1971 | Wallace | 174/138 F |
| 3,617,615 A | 11/1971 | Balzer | 174/87 |
| 3,622,822 A | 11/1971 | Lofstrand | 310/89 |
| 3,711,632 A | 1/1973 | Ghirardi | 174/135 |
| 3,711,633 A | 1/1973 | Ghirardi et al. | 174/135 |
| 3,757,031 A | 9/1973 | Izraeli | 174/138 F |
| 3,804,971 A * | 4/1974 | Bazille, Jr. | 174/88 R |
| 3,846,725 A | 11/1974 | Mears, Jr. | 336/92 |
| 3,879,574 A | 4/1975 | Filreis et al. | 174/76 |
| 3,916,086 A | 10/1975 | Gillemot et al. | 174/93 |
| 3,936,129 A | 2/1976 | Guy | 434/464 |
| 4,029,895 A | 6/1977 | Scarborough | 174/138 F |
| 4,035,051 A | 7/1977 | Guy | 439/464 |
| 4,084,067 A * | 4/1978 | Gillemot | 174/92 |
| 4,095,044 A | 6/1978 | Horsma et al. | 174/138 F |
| 4,192,965 A | 3/1980 | Baum | 174/135 |
| 4,234,760 A | 11/1980 | Lawson | 174/138 F |
| 4,426,108 A * | 1/1984 | Kesselman | 292/307 B |
| 4,451,696 A | 5/1984 | Beinhaur | 174/92 |
| 4,550,220 A | 10/1985 | Kitchens | 174/138 F |
| 4,647,713 A | 3/1987 | Nijs et al. | 174/21 R |
| 4,736,072 A | 4/1988 | Hvidsten | 174/93 |

(Continued)

FOREIGN PATENT DOCUMENTS

| | | |
|---|---|---|
| DE | 20 30 073 A | 1/1972 |
| GB | 1 466 649 A | 3/1977 |

*Primary Examiner*—Michael C. Zarroli
(74) *Attorney, Agent, or Firm*—Robert A. McCann; Aimee E. McVady

(57) ABSTRACT

An enclosure formed from a first compartment and an identical second compartment to house an electrical connector. Each compartment has a main body that is defined by a first wall, a second wall and ends. The first wall of each compartment has an outer tab with at least one projection that extends inwards and an inner tab positioned adjacent to the outer tab. The second wall of each compartment has an aperture. When the compartments are mounted to each other to form the enclosure, the projection of the first wall of the first compartment is disposed in the aperture in the second wall of the second compartment and the projection of the first wall of the second compartment is disposed in the aperture in the second wall of the first compartment. The enclosure also includes a label and label cover that are disposed inside the enclosure to identify the connector.

9 Claims, 3 Drawing Sheets

U.S. PATENT DOCUMENTS

| | | | |
|---|---|---|---|
| 4,749,363 A | 6/1988 | Luska et al. | 439/367 |
| 4,795,857 A | 1/1989 | McInnis | 174/138 F |
| 4,841,413 A | 6/1989 | Mizerak | 361/400 |
| 4,935,582 A | 6/1990 | Calligaris | 174/92 |
| 4,968,857 A | 11/1990 | McGrane | 174/84 C |
| 4,983,132 A * | 1/1991 | Weidler | 439/786 |
| 4,985,598 A * | 1/1991 | Bubica et al. | 174/93 |
| 5,003,278 A | 3/1991 | May | 336/92 |
| 5,046,766 A | 9/1991 | Lomberty et al. | 285/419 |
| 5,132,495 A | 7/1992 | Ewing et al. | 174/138 F |
| 5,173,573 A | 12/1992 | Jervis | 174/138 F |
| 5,191,172 A | 3/1993 | Garganese | 174/74 A |
| 5,306,176 A * | 4/1994 | Coffey | 439/367 |
| 5,382,756 A * | 1/1995 | Dagan | 174/92 |
| 5,393,932 A | 2/1995 | Young et al. | 174/84 R |
| 5,397,859 A | 3/1995 | Robertson et al. | 174/92 |
| 5,561,269 A | 10/1996 | Robertson et al. | 174/92 |
| 5,606,150 A | 2/1997 | Radliff et al. | 174/92 |
| 5,684,274 A | 11/1997 | McLeod | 174/92 |
| 5,691,508 A | 11/1997 | Radliff et al. | 174/92 |
| 5,696,351 A | 12/1997 | Benn et al. | 174/92 |
| 5,763,835 A | 6/1998 | Huynh-Ba et al. | 174/92 |
| 5,828,005 A | 10/1998 | Huynh-Ba et al. | 174/92 |
| 5,844,171 A | 12/1998 | Fitzgerald | 174/92 |
| 6,111,201 A | 8/2000 | Drane et al. | 174/92 |
| 6,169,250 B1 | 1/2001 | Bolcato | 174/92 |
| 6,246,003 B1 | 6/2001 | Ferris et al. | 174/92 |
| 6,450,829 B1 * | 9/2002 | Weisz-Margulescu | 439/352 |
| 2002/0076964 A1 | 6/2002 | Weisz-Margulescu | 439/263 |

* cited by examiner

TRANSPARENT INSULATING ENCLOSURE

CROSS-REFERENCE TO RELATED APPLICATIONS

Applicants claim, under 35 U.S.C. §119(e), the benefit of priority of the filing date of Apr. 10, 2003, of U.S. Provisional Patent Application Ser. No. 60/461,907, filed on the aforementioned date, the entire contents of which are incorporated herein by reference.

FIELD OF THE INVENTION

The present invention relates to insulating enclosures and, more particularly, to a transparent insulating enclosure and associated label cover for electrical tap or splice connectors.

BACKGROUND OF THE INVENTION

Prior tap or splice covers which protect and insulate the tap or splice are black or colored and, thus, opaque so the connection cannot be seen when closed. If a problem with a connection is suspected, the cover must be removed for inspection purposes. Damage to the connection is possible during the removal process. This type of inspection can be very time consuming particularly if there are a lot of connectors in a particular circuit. Also, when the covers are removed, it can be dangerous to perform these inspections with the circuit in the energized state.

It is thus an advantage to allow for post installation inspection of the tap or splice. The cover of the present invention also provides for improved labeling and identification protection for the tap or splice connection.

SUMMARY OF THE INVENTION

The present invention is directed to a transparent enclosure for an electrical connector. The enclosure includes a first compartment and an identical second compartment. Each compartment has a main body defined by a first wall, a second wall, and ends. The first wall of each compartment has an outer tab with at least one projection extending inwards and an inner tab positioned adjacent to the outer tab. The second wall of each compartment has an aperture there through. When one of the compartments is mounted to the other compartment, the projection of each first wall is disposed in the aperture in each second wall so as to secure the compartments to each other to form the enclosure. The electrical connector is positioned between the first compartment and the second compartment so that when the compartments are secured to each other, the electrical connector is secured between the compartments.

DETAILED DESCRIPTION OF PREFERRED EMBODIMENTS

Figure 1:
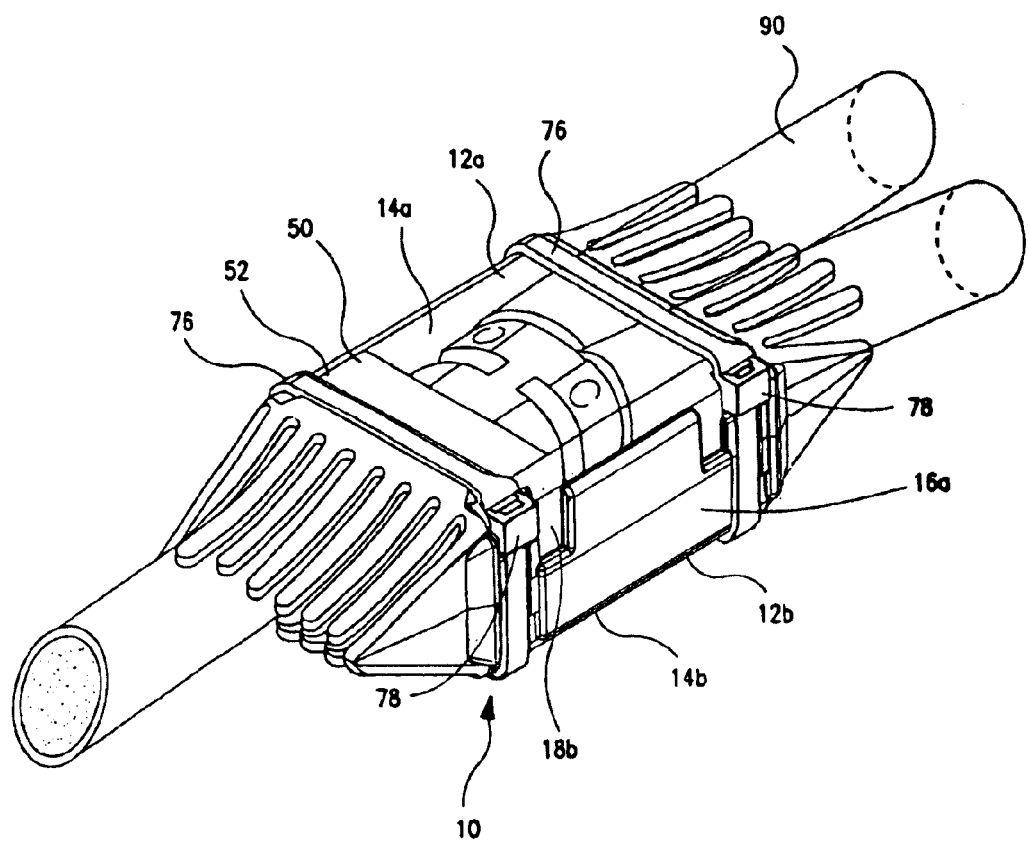
FIG. 1 is a perspective view of the transparent insulating enclosure of the present invention with an electrical connector disposed therein.
Figure 2:
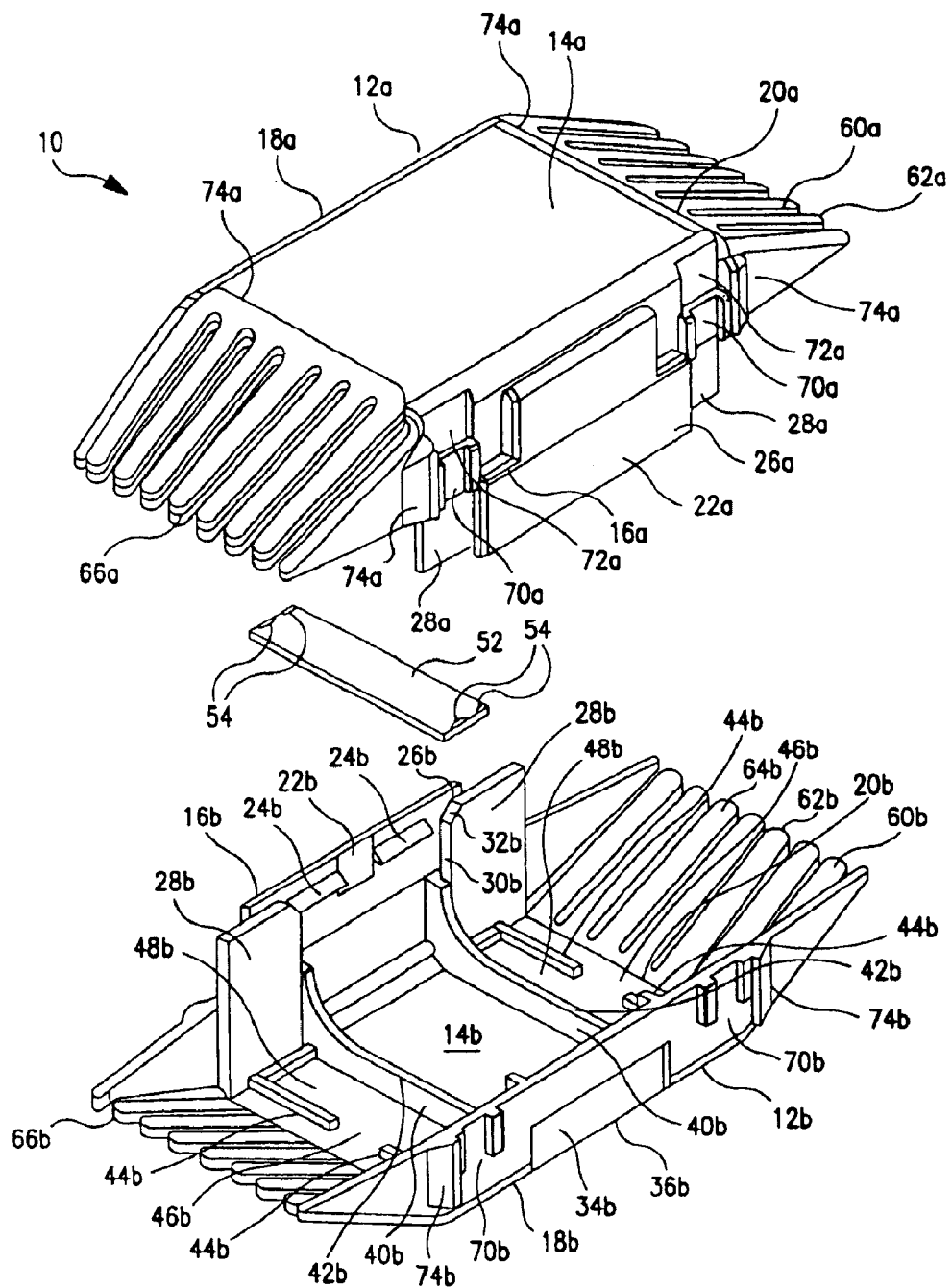
FIG. 2 is an exploded view of the transparent insulating enclosure of FIG. 1.

The design shown in FIGS. 1 and 2 discloses a transparent insulating enclosure 10 for electrical connectors 90 in accordance with a preferred embodiment of the present invention.

The enclosure 10 consists of two separate identical halves or compartments 12a and 12b. Each half or compartment 12a, 12b has a main body 14a, 14b that is defined by a first wall 16a, 16b, a second wall 18a, 18b and ends 20a, 20b. The first wall 16a, 16b and the second wall 18a, 18b of each enclosure half 12a, 12b snap together by means of a new latching system to form the insulating enclosure.

The first walls 16a, 16b of the latching system include a main outer tab 22a, 22b with two projections 24a, 24b and two inner tabs 28a, 28b that support and secure the second wall 18a, 18b of the other enclosure half from the inside of the enclosure. The two inner tabs 28a, 28b have side 30a, 30b and end 32a, 32b lead-in chamfers that facilitate the mutual locating of both enclosure halves for assembly. The outer main tab 22a, 22balso includes extended ends 26a, 26b that serve as flashover barriers for the enclosure.

Upon pressing the enclosure halves 12a, 12b together, the second walls 18a, 18b become trapped between the inner tabs 28a, 28b and the outer tabs 22a, 22b of the first walls 16a, 16b. The second wall 18a, 18b of each enclosure half has an aperture 34a, 34b extending from approximately mid-height of the wall to the top 36a, 36b of the wall. As the enclosure halves are pressed together, the projections 24a, 24b on the inside of the main outer tabs 22a, 22b snap into the apertures 34a, 34b in the second walls 18a, 18b of the opposite enclosure half, and lock the enclosure in a closed, position.

If necessary, the enclosure may be opened by inserting a flat tip screwdriver, or similar tool, between the projections 24a, 24b located on the inside of outer main tabs 22a, 22b to pry the enclosure halves away from each other.

Each enclosure half has inner flanges 40a, 40b that extend across the enclosure half. The inner flanges 40a, 40b serve as stops for the electrical connector to prevent the connector from being pulled out of the insulating enclosure. The flanges 40a, 40b have C-shaped middle portions 42a, 42b that accommodate the electrical cables that are crimped in the connector.

Ridges 44a, 44b are positioned on each main body 14a, 14b at the outer side of the flanges 40a, 40b so as to form a pocket 48a, 48b there between. The pocket 48a, 48b accommodates a label or tag 50 and label cover 52. It is important to place the label inside the enclosure to prevent any tampering with the information on the label after the connection has been completed and the enclosure has been snapped together on a connector. An additional benefit from the internal placement of the label is that the label cover and the label can not be accidentally knocked off or stripped off and lost.

The label cover 52 includes indentations 54 located on both sides of the label cover. The indentations 54 engage the walls of the enclosure thereby allowing the label cover 52 to be inserted with either side facing out.

Each side of the label cover 52 has a matted finish which allows the label cover 52 to be used as a backup for a separate label. If there is not a label, the information may be written directly on the label cover matted surface.

To facilitate removal of the label 50, an opening 46a, 46b is provided between each ridge 44a, 44b for insertion of a pry tool.

The ends 20a, 20b of the insulating enclosure include multiple narrow fingers 60a, 60b that extend outward from each enclosure main body 14a, 14b at a narrow angle with respect to the split plane of the enclosure. Such angle minimizes catch points, to allow other cable runs to be pulled next to the enclosure. The fingers 60a, 60b are parallel to one another with only a slight narrowing toward their tips 62a, 62b. The underside of the tips of the fingers have a small flatten portion 64a, 64b which prevents the tips from "pinching" or "digging" into the electrical cable insulation. The outer edges 66a, 66b of the fingers are rounded to prevent injury to the installers hands. The fingers are sufficiently flexible and resilient to conform closely to the cables and to prevent foreign objects, such as the installer's fingers or tools, from penetrating the enclosure and contacting the connector placed inside. The amount of flexing depends on the size of the cables used in a particular connection. Thus, the insulating enclosure is designed to be used with a wide range of cable sizes.

The fingers that are pushed apart by the inserted cables flex away, while the remaining fingers, that are not in contact with the cables, stay close together and prevent an accidental insertion of a tool or the installer's finger into the connection that may be energized.

Being fairly strong and resilient, the fingers provide a good hold of the connected cables and prevent the insulating enclosure from producing a rattling sound, if subjected to slight movements.

The enclosure remains secured around an electrical connector by its own features and strength. However, if desired, cable ties or waxed cords may be used for added security.

Each half 12a, 12b of the insulating enclosure has external locating slots 70a, 70b. When the enclosure halves 12a, 12b are secured to each other, the locating slots are aligned so as to create continuous slots around the enclosure. The aligned locating slots are designed to receive a cable tie 76 or waxed cord that wraps around the enclosure. The enclosure also includes recesses 72a, 72b located adjacent to the slots 70a, 70b to accommodate the cable tie heads 78 and lips 74a, 74b located on the side of the slot 70a, 70b and the top of the enclosure halves. The lips 74a, 74b help to maintain the cable tie in the locating slots around the enclosure.

The transparent enclosure allows the inspection of both the quality of the connector crimping and all markings on the connector without opening the insulating enclosure.

Additionally, the insulating enclosure may have certain identification information molded on the fingers so that it does not obstruct the view of the connector inside the enclosure.

Figure 3:
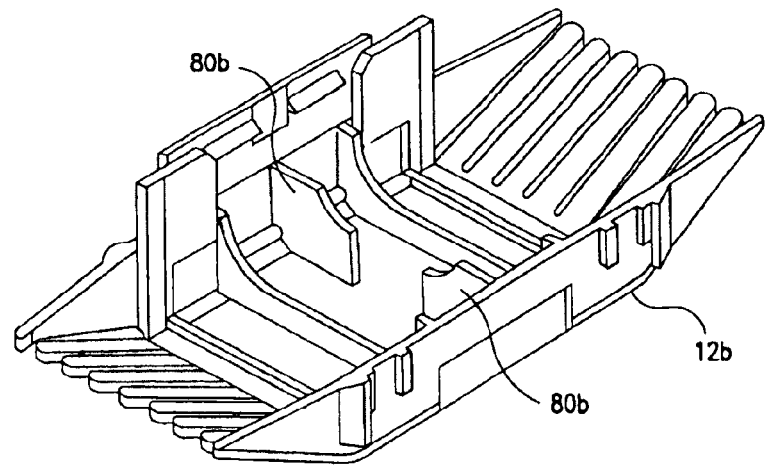
FIG. 3 is a perspective view of an alternative embodiment of the transparent insulating enclosure of FIG. 1 with a pair of ribs that extend across the main body.
Figure 4:
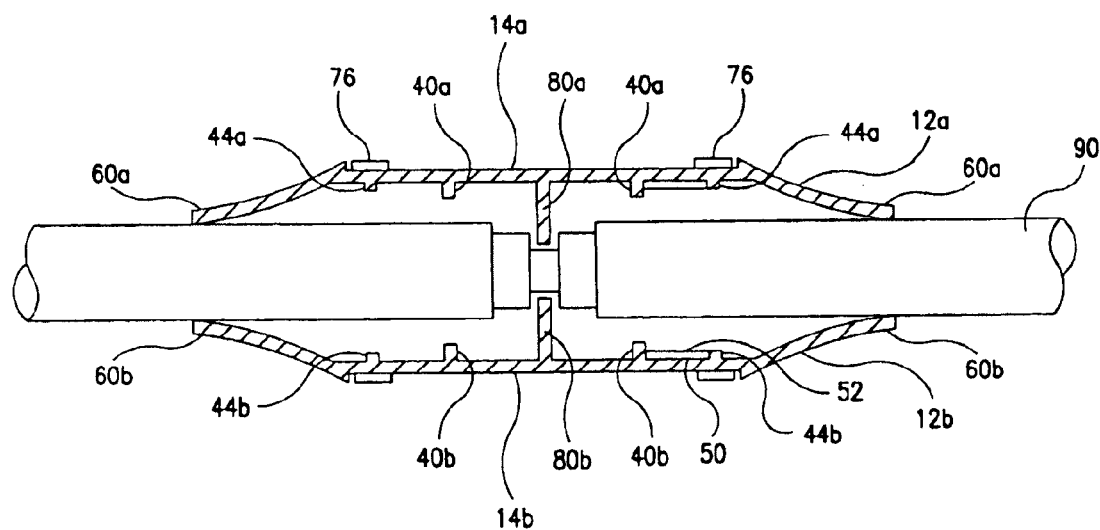
FIG. 4 is a side view of the transparent insulating enclosure of FIG. 3 with an electrical connector disposed therein.

FIGS. 3 and 4 describe an alternative embodiment of the transparent insulating enclosure for electrical connectors. In addition to the features described above, the alternative embodiment incorporates a pair of retaining flanges 80a, 80b in each half of the enclosure. The pair of retaining flanges 80a, 80b are placed in the middle of the enclosure length. The retaining flanges 80a, 80b function as a retainer for connectors that do not project beyond the outer surface of the cable insulation. Without the retaining flanges 80a, 80b, a tap style connector would be retained only by friction between the enclosure and the cable insulation. This type of retention is not positive. The center retaining flanges 80a, 80b penetrate into slots formed in certain styles of tap connectors to positively retain the connector inside the enclosure.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. An enclosure for an electrical connector, the enclosure comprising: a first compartment having a main body defined by a first wall, a second wall, and ends, the first wall having an outer tab with at least one projection extending inwards and an inner tab adjacent to the outer tab, the second wall having an aperture therethrough;

a second compartment identical to the first compartment, wherein the second compartment has a main body defined by a first wall, a second wall and ends, the first wall having an outer tab with at least one projection extending inwards and an inner tab adjacent to the outer tab, the second wall having an aperture therethrough; and a plurality of fingers extending from the ends of the first compartment and the second compartment, the fingers are disposed at an angle for holding cables connected to the electrical connector;

wherein one of the first compartment or the second compartment is mounted to the other of the first compartment or the second compartment such that the at least one projection of the first wall of the first compartment is disposed in the aperture in the second wall of the second compartment and the at least one projection of the first wall of the second compartment is disposed in the aperture in the second wall of the first compartment, whereby the electrical connector is disposed between the first compartment and the second compartment.

2. The enclosure of claim 1, further comprising at least one flange extending across the main body of the first compartment and the main body of the second compartment for securing the electrical connector.

3. The enclosure of claim 1, further comprising a pair of retaining flanges extending across the main body of the first compartment and the main body of the second compartment for securing the electrical connector.

4. The enclosure of claim 1, wherein the first compartment and the second compartment are transparent.

5. A transparent enclosure for an electrical connector, the enclosure comprising:

a first compartment having a main body defined by a first wall, a second wall and ends, the main body having at least one flange extending across the main body and at least one ridge positioned near the flange on the main body, wherein the flange and the ridge define a pocket;

a second compartment adapted to be mounted to the first compartment, wherein the second compartment has a main body defined by a first wall, a second wall and ends, the main body having at least one flange extending across the main body and at least one ridge positioned near the flange on the main body, wherein the flange and the ridge define a pocket; and at least one label positioned in one of the pockets for providing identification markings and at least one cover being disposed over the label in the pocket for protecting the label and the identification markings, wherein the second compartment is mounted to the first compartment so that the flanges are aligned to secure the electrical connector there between.

6. The enclosure of claim 5, wherein the cover has a plurality of indentations for securing the cover to the main body.

7. An enclosure for an electrical connector, the enclosure comprising:
- a first compartment having a main body defined by a first wall, a second wall, and ends, the first wall having an outer tab with at least one projection extending inwards and an inner tab adjacent to the outer tab, the second wall having an aperture therethrough; and
- a second compartment identical to the first compartment, wherein the second compartment has a main body defined by a first wall, a second wall and ends, the first wall having an outer tab with at least one projection extending inwards and an inner tab adjacent to the outer tab, the second wall having an aperture therethrough;
- wherein the first compartment and the second compartment are transparent and one of the first compartment or the second compartment is mounted to the other of the first compartment or the second compartment such that the at least one projection of the first wall of the first compartment is disposed in the aperture in the second wall of the second compartment and the at least one projection of the first wall of the second compartment is disposed in the aperture in the second wall of the first compartment, whereby the electrical connector is disposed between the first compartment and the second compartment.

8. The enclosure of claim 7, further comprising at least one flange extending across the main body of the first compartment and the main body of the second compartment for securing the electrical connector.

9. The enclosure of claim 7, further comprising a pair of retaining flanges extending across the main body of the first compartment and the main body of the second compartment for securing the electrical connector.

* * * * *